United States Patent [19]

Zeman

[11] Patent Number: 5,263,791
[45] Date of Patent: Nov. 23, 1993

[54] IRRIGATION TUBING WITH IMPROVED DISCHARGE HOLES

[76] Inventor: David Zeman, c/o Disco, P.O. Box 42040, Las Vegas, Nev. 89116

[21] Appl. No.: 919,750

[22] Filed: Jul. 27, 1992

Related U.S. Application Data

[63] Continuation-in-part of Ser. No. 409,005, Sep. 9, 1989, Pat. No. 5,141,360.

[51] Int. Cl.⁵ .............................. E02B 13/00
[52] U.S. Cl. ...................... 405/43; 405/45; 239/542
[58] Field of Search ............ 405/43, 45, 48, 37; 138/119, 120, 121; 239/547

[56] References Cited

U.S. PATENT DOCUMENTS

| | | | |
|---|---|---|---|
| 986,940 | 3/1911 | Osborne | 405/43 |
| 3,512,363 | 5/1970 | Whear | 405/37 |
| 4,061,272 | 12/1977 | Winston | 405/43 X |
| 4,095,750 | 6/1978 | Gilead | 405/43 X |
| 4,246,936 | 1/1981 | Luz | 239/547 X |

Primary Examiner—Dennis L. Taylor

[57] ABSTRACT

The pressure drop and, hence, the flow through the holes in the peripheral walls of irrigation tubing can be increased without increasing the cross-sectional area of such holes by using non-round holes instead of conventional cylindrical holes. Preferred results when the non-round holes have a star shaped cross-sectional configuration defined by flexible fingers.

16 Claims, 2 Drawing Sheets

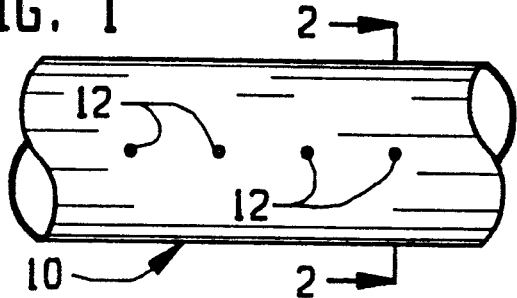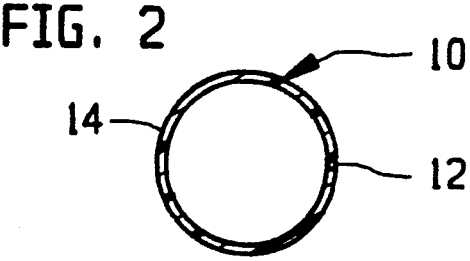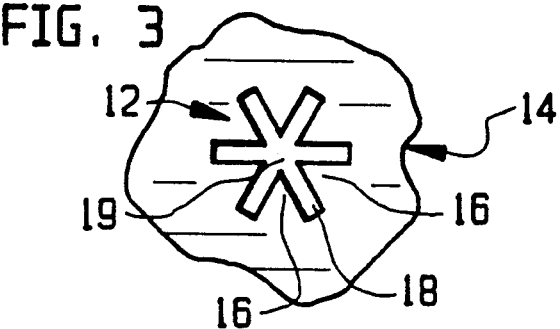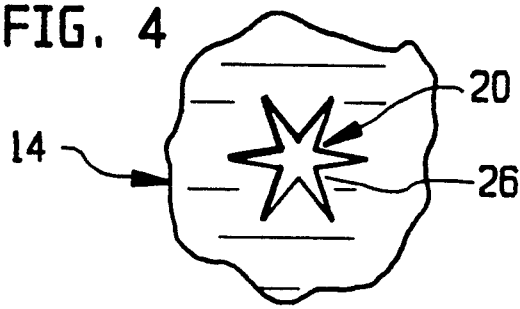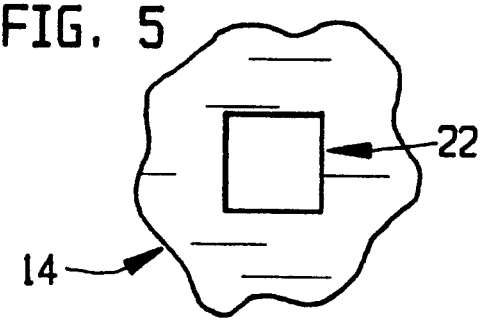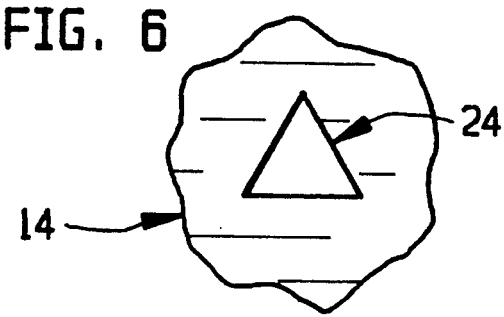

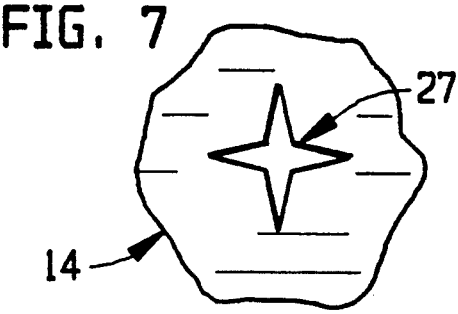
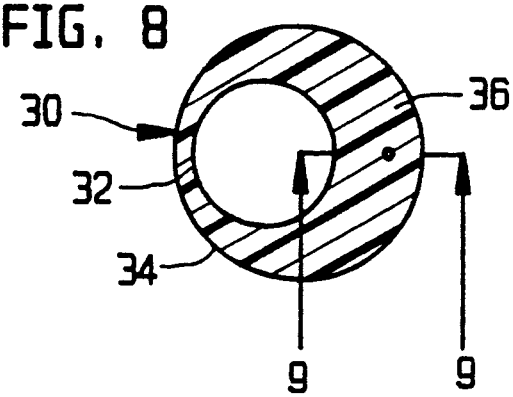
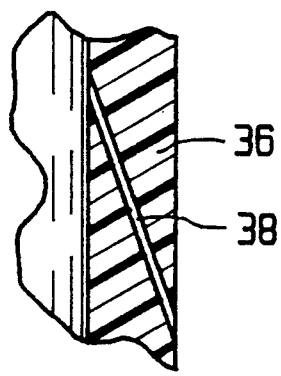

IRRIGATION TUBING WITH IMPROVED DISCHARGE HOLES

CROSS REFERENCE TO RELATED APPLICATION

This application contains subject matter which is disclosed in the U.S. patent application Ser. No. 07/409,005 filed by Applicant herein on Sept. 9, 1989 entitled "Irrigation Tubing". This application is a continuation-in-part of this parent application, now patent No. 5,141,360. The entire disclosure of this parent application is incorporated herein by reference for the purpose of amplifying the disclosure of this specification.

BACKGROUND OF THE INVENTION

The invention set forth in the specification pertains to synthetic polymer irrigation tubing with improved discharge holes or openings.

Currently large amounts of synthetic polymer irrigation tubing are used for a wide variety of agricultural and related applications. Such tubes are normally formed by the extrusion of a synthetic polymer or polymer composition which is comparatively flexible when present in a comparatively thin sheet or the like and which is substantially rigid when used in significantly thicker sheet or body into a cylindrical tube and then by forming a series of discharge holes in the wall of such a tube. Of course there are many variants on this procedure. For example, a well known type of irrigation tubing is formed by extrusion so that a "dome" appearing much as half of a cylinder is located on a cylindrical tube and holes are drilled connecting the interior of the cylinder with the partial cylinder and connecting the interior of the latter with the outside of the complete tube. This type of tubing is commonly referred to as "Bi-Wall" tubing.

Structures such as the latter have been developed because of the fact that for some applications it has been impossible to drill holes in tubing which are of such a character that under normal conditions of use only extremely limited quantities of water will flow through them. It is believed that such holes have always been cylindrical or nearly cylindrical in shape and configuration. In accordance with concepts dating back to Roman civilization such holes have on occasion been slanted relative to the interiors of such tubes to control flow. Many of the variants on traditional cylindrical tubing are intended to overcome this problem of the holes in irrigation tubes passing more than desired amounts of water.

Thus, for example, the "Bi-Wall" tubing indicated in the preceding is intended to and does in fact limit the amount of water dispensed as it is used by achieving a pressure step down effect. In other words water in the cylindrical tube in such a structure will flow though the holes to the partially cylindrical "add on" tube at a rate which is determined in part by the differential in the pressure between the two tubes, in part by the dimensions of the holes connecting them and by other factors and, in turn water will be distributed to the ambient by the pressure gradient between the secondary add-on tube and the ambient and the dimensions of the holes leading to the exterior of the tubing.

An understanding of the present invention does not require a detailed understanding of all of the different structures and expedients which have been proposed and, to varying extents, used and accepted as suitable of use in dispensing only very limited quantities of water from the interior of an irrigation tube. It is considered obvious that any irrigation tubing in which other than holes formed in the wall of the tube are used to dispense water will be more expensive than tubing in which peripheral holes in the wall of a tube are used for this purpose. This is significant with the invention since in the field of the invention minor differences in costs can be critical from a commercial standpoint.

BRIEF SUMMARY OF THE INVENTION

It is considered from the preceding discussion that an objective of the invention is to provide irrigation tubing with new and improved discharge holes. An objective is to provide tubes as indicated which may be easily and conveniently manufactured at a comparatively nominal cost and which can be used satisfactorily over comparatively prolonged periods. A further objective of the invention is to provide irrigation tubing which can be used to discharge comparatively limited quantities of water which is cheaper to produce than structures which use some expedient other than a single hole in a wall to dispense limited quantities of water.

In accordance with this invention these and other objectives of the invention are achieved by providing an elongated irrigation tube which has a peripheral wall in which there is a series of dispensing holes leading through said wall from the interior of said tubing to the exterior of said tubing in which the improvement comprises: said holes are all identical holes of a non-circular configuration on a plane at a right angle to flow and are of a cross-sectional area and length such that the flow during the use of said tubing through said holes is less than the flow through a cylindrical hole having the same cross-sectional area and the same length when used under the same circumstances.

Of course, the invention has aspects and features which cannot be incorporated into a simple, comparatively short statement such as the preceding. Thus, for example, the preceding does not indicate the precise nature of a preferred embodiment of a hole in an irrigation tube in accordance with this invention. Items such as the latter will be apparent from the remainder of this specification and the accompanying drawing.

BRIEF SUMMARY OF THE DRAWING

Because of the nature of the invention it is believed that it is best more fully described with reference to the accompanying drawing in which:

FIG. 1 is a side elevational view of a short length of a presently preferred irrigation tube in accordance with the invention;

FIG. 2 is a cross-sectional view taken at line 2—2 of FIG. 1;

FIG. 3 is a partial view of the tube shown in the preceding figures at an enlarged scale showing the configuration of a hole as used in this tube;

FIG. 4 is a view corresponding to FIG. 3 showing the configuration of a modified hole used in an irrigation tube in accordance with the invention;

FIG. 5 is a view corresponding to FIG. 3 showing the configuration of a further modified hole used in an irrigation tube in accordance with the invention;

FIG. 6 is a view corresponding to FIG. 3 showing the configuration of a still further modified hole used in an irrigation tube in accordance with the invention;

FIG. 7 is a view corresponding to FIG. 3 showing the configuration of an additional hole used in an irrigation tube in accordance with the invention;

FIG. 8 is a cross-sectional view corresponding to a view taken at line 2—2 in FIG. 1 at an enlarged scale showing an additional modified tube in accordance with the invention; and FIG. 9 is a partial cross-sectional view taken at line 9—9 in FIG. 8.

In the subsequent detailed description and in the drawings the same numbers are used in or in connection with the embodiments shown in various different figures to designate items which are the same or substantially the same in such figures in order to avoid having to separately describe such items in connection with each embodiment of the invention. Both in the drawings and in the subsequent discussion matters which are essentially matters of routine skill in the field of the invention have not been illustrated or described.

Neither has any effort been made to illustrate or describe all theoretically permutations and combinations and modification of the features of the invention which are within the skill of an ordinary worker in the field of the construction of tubing used for plant watering or irrigation purposes. For this reason the invention is to be considered as being limited solely by the accompanying claims forming a part of this specification and is not to be considered as being limited to items which appear precisely as illustrated in the drawings.

DETAILED DESCRIPTION OF THE PREFERRED EMBODIMENTS

In the initial figures of the drawing there is shown a presently preferred embodiment of a cylindrical irrigation tube 10 in accordance with the invention. This tube 10 is formed by the extrusion of a synthetic polymer composition such as is commonly used at the present time to form drip or seep irrigation tubes so that the wall of the tube 10 is sufficiently thick so that there is no reasonable danger of the tube 10 rupturing under the anticipated conditions of use. Such thickness will normally vary somewhat depending upon the nature of the material used to form the tube 10. A series of spaced holes 12 is located in the tube 10; normally these holes will be equally spaced from one another and will be located along the length of the tube 10.

The invention pertains to these holes 12. In accordance with conventional practice these holes would be cylindrical or substantially cylindrical holes formed in the wall 14 of the tube 10 by known techniques such as the use of a laser. In accordance with the present invention the holes 12 are preferably non round holes having a shape which is somewhat difficult to describe but which is essentially of a star shaped character. Each of the holes 12 includes a series of internally extending fingers or projections 16 separated by gaps or grooves 18 which meet in a centrally located open area 19.

In each of FIGS. 3-7, the drawing figures is in a plane at a right angle to flow direction.

The grooves 18 are preferably so narrow and the projections 16 are preferably so close together that under the expected conditions of use any water flow through the holes 12 will be limited by the boundary layers (not shown) formed during use in the interiors of these holes 12. Normally such layers are a few thousandths of an inch thick. In achieving a maximum flow limiting effect with the invention the spacing of the projections 16 and the grooves 18 should be such that the boundary layers on adjacent projections tend to interfere with or interact with one another without stopping flow through a hole 12 and in which there is no laminar flow and only substantially negligible turbulent flow. However, as a practical matter it is believed that it is normally impossible to create holes 12 having a profile or cross-sectional configuration as indicated which are of such dimensions.

In accordance with the present invention it has been recognized that normally it will be possible to form a hole as the hole 12 so that under the normal conditions of use of an irrigation tube there principally will be turbulent flow and slow movement of boundary layers through holes 12 as described. Thus, the holes 12 should be of such a character that no or substantially no laminar flow is present within these holes 12. If the tube 10 is formed as discussed using a polymer composition which is somewhat flexible when present in a member of a comparatively thin cross-section it is believed that the limited flow through a hole 12 during use of the tube 10 will result in minor pressure differentials which will cause some flexure of the projections 16. The latter will tend to promote turbulent flow and to minimize any tendency toward laminar flow.

It is necessary to note that the precise nature of the flow within an extremely small hole such as is discussed here is either impossible or substantially impossible to directly measure. Further it is believed that the thickness of a boundary layer in an irrigation tube will vary in accordance with a number of different factors such as the specific material used to form the tube, water temperature, and the like. Hence, these references to boundary layers, turbulent and laminar flows are made assuming that the flow within a hole such as a hole 12 involves boundary layers, laminar and turbulent flows as have been studied in connection with conventional piping and the like. It is believed that the results which can be and have been achieved justify this belief. Also, because of such possible variation it is not considered that it will be meaningful to attempt to specify precise dimensions for a hole 12 or any of the other holes herein specified.

Such results can also be indicated in an essentially empirical manner by specifying that in accordance with the invention the holes 12 should be holes having a non-circular cross-sectional configuration in a plane at a right angle to flow and having an open cross-sectional area and length such that the pressure drop during the use of a tube 10 through these holes 12 is greater than the pressure drop through a cylindrical hole having the same cross-sectional area and the same length when used under the same circumstances. Preferably the pressure drop in accordance with the invention is at least twice that through such a cylindrical hole.

Such pressure drop is a result of a number of factors. One of these is the total wall area within a hole 12. The wall area of a hole of a specific length and cross-sectional area can be increased to exceed that of a cylindrical hole of the same length and cross-sectional configuration so that surface layer effects tend to retard flow by increasing the degree to which the hole varies from a normal round shape. This is indicated by the holes 20, 22 and 24 shown in FIGS. 4, 5 and 6, respectively. The hole 20 has a cross-sectional configuration in a plane at a right angle to flow which is that of a 6 pointed star; the hole 22 has a square cross-sectional configuration in a plane at a right angle to flow; and the hole 24 has the cross-sectional configuration of an equilateral triangle in a plane at a right angle to flow.

These various cross-sectional configurations are indicative of all of the hole cross-sectional configurations which can be used to obtain at least some results in accordance with the broad concepts of the invention. As an example of this hole 22 can be varied slightly so as to have the cross-sectional configuration of a diamond or parallelogram in a plane at a right angle to flow. Similarly the hole 24 can be varied so that its cross-sectional configuration is that of a comparatively "flat" or short triangle in a plane at a right angle to flow. In theory either of them could be modified so as to in effect be a straight slit having closely spaced or adjacent walls. This is considered to be undesirable because of the danger of such a slit tending to act more or less as a Bunsen valve under the conditions of use of a tube such as a 10.

So as to avoid this possibility and so as to achieve a maximum pressure drop during the use of a tube 10 it is presently preferred to use tubing having holes which include internal projections 26 such as the projections 16 used with a hole 12. Because of difficulties in forming extremely small holes by what is considered to be presently the best of the techniques for forming them—the use of lasers to burn such holes—it is considered that currently it is best to use holes which more or less approximate the cross-sectional configuration of a hole 12. Such a hole is the hole 20 described in the preceding. It is noted that it has a series of pointed projections 26 which are quite similar to those of a hole 12.

In order to maximize the pressure drop across a hole such as the hole 20 it is desirable to increase the number of points of its star shaped cross-sectional configuration to as great an extent as reasonably possible. As a practical matter it is presently considered that at present it is impractical to try and achieve a star shaped cross-sectional configuration having more than 6 points because of manufacturing problems. In some applications a star shaped hole 27 having 4 points as shown in FIG. 7 may be considered preferable.

This is because of the fact that normally the irrigation water used with a tube 10 in accordance with this invention will contain some comparatively small particles which are sufficiently large so that they can become lodged or caught in a hole such as the hole 12. With the invention the projections 16 or 26 or other similar projections used will act essentially as flexible vanes within the holes within which they are located and will tend to flex and bend somewhat so as to tend to pass many of such particles as a tube 10 is used under normal conditions. To achieve this results the projections within a hole must be relatively thin and flexible. It is considered that the projections 16 and 26 are of such a character.

In general when a tube 10 is to be used under conditions in which it is expected to be used with water containing significant amounts of contamination particles the holes such as the holes 12 in such a tube should be oriented radially relative to the tube 10. This is because with such an orientation a particle does not have to travel very far along the length of a hole in order to pass through the wall 14 and, hence, the less the chances of such a particle becoming jammed in the hole. However, in some applications it may be desired for the holes used to provide more resistance to flow than will be obtained with a hole having the length which is the same as the wall thickness of a concentric tube.

When this problem is encountered it can be overcome by using a tube 30 as shown in FIGS. 8 and 9 which has eccentric inner and outer walls 32 and 34, respectively, so as to provide a relatively thick region 36 extending the length of the tube 30 and by slanting a hole 38 having any of the cross-sectional configurations in a plane at a right angle to flow discussed in the preceding through this region 36. Which of such configurations and which dimensions and length of a hole as described will be best in a specific circumstance will vary in accordance with a number of factors such as the surface characteristics of the material within which a hole is formed, the particle content of the water, the pressures used with it, the temperature and the like. Such factors are all of a type which make it substantially to set out precise hole dimensions which may be useful in a given application.

Because of the nature of the invention it is considered that it capable of being used in may other different ways with both known and presently unknown irrigation tubing structures. Thus, for example, it is considered that the Bi-Wall product discussed in the initial part of this specification can be improved by using holes as herein indicated. The shape and dimensions of suitable holes for any such application can be easily determined by routine experimentation.

I claim:

1. An elongated irrigation tube;
   a peripheral wall defining said irrigation tube, walls defining a series of dispensing holes leading through said peripheral wall from the interior of said irrigation tube to the exterior of said irrigation tube so that said dispensing holes permit outflow of irrigation water from said irrigation tube, the improvement comprising:
   said holes all being identical holes of a non-circular configuration wherein all the walls defining each of said holes are substantially straight in a plane at a right angle to irrigation water flow, and of a cross-sectional area and length such that the flow during the use of said tubing through said holes is less than the flow through the same number of cylindrical holes each having the same cross-sectional area as the non-circular holes and the same length when used under the same circumstances.

2. An elongated irrigation tube as claimed in claim 1 wherein:
   all of said holes have a diamond shaped cross-sectional configuration.

3. An elongated irrigation tube as claimed in claim 1 wherein:
   all of said holes have a triangular shaped cross-sectional configuration.

4. An elongated irrigation tube as claimed in claim 1 wherein:
   all of said holes have a star shaped cross-sectional configuration.

5. An elongated irragation tube as claimed in claim 4 wherein:
   said star shaped configuration of each of said holes is defined by a series of projections extending into the interior of a hole from the outer dimensions thereof, said projections serving to minimize the open cross-sectional area of said hole.

6. An elongated irrigation tube formed of a polymer composition material which is flexible when used in a comparatively thin member, a peripheral wall having interior and exterior wall surfaces defining said irrigation tube, walls defining a series of dispensing holes leading through said peripheral wall from the interior of said irrigation tube to the exterior of said irrigation tube so that said dispensing holes permit outflow of irrigation water from said irrigation tube, said dispensing holes all being identical holes of a noncircular star-shaped configuration in a plane at a right angle to irrigation water flow, said star-shaped configuration of each of said holes being defined by a series of projections extending into the interior of each hole from the outer edge thereof, said projections serving to minimize the open cross-sectional area of each said hole into that location said projections within each of said holes being sufficiently thin so as to be capable of flexing so as to be able to flex to pass a particle which may become lodged in one of said holes, said dispensing holes being of a cross-sectional area and length such that the flow during the use of said tubing through said holes is less than the flow through the same number of cylindrical holes each having the same cross-sectional area as the non-circular holes and the same length when used under the same circumstances.

7. An elongated irrigation tube as claimed in claim 6 wherein said star shaped configuration corresponds to the shape of a star having at least 6 points.

8. An elongated irrigation tube of substantially uniform cross-section formed of a synthetic polymer composition material which is flexible when used in a comparatively thin member and which is substantially inflexible when used in a thicker member, a peripheral wall defining said elongated irrigation tube, a series of dispensing holes leading through said peripheral wall from the interior of said tubing to the exterior of said tubing through which irrigation water outflows from said irrigation tube, the improvement comprising:
    said dispensing holes all being identical holes, each of said holes having a substantially uniform cross-section throughout its length in a plane at a right angle to the flow direction and having a series of flexible projections extending into the interior thereof so that the circumference of each dispensing hole in a plane at a right angle to the direction of irrigation water outflow is larger than the circumference of a circular hole of the same area, said projections being located sufficiently close to one another so that the boundary layers formed by water flow past said projections will retard the flow of water through said holes.

9. An elongated irrigation tube as claimed in claim 8 wherein:
    said holes are of a star shaped configuration.

10. An elongated irrigation tube as claimed in claim 8 wherein:
    said projections are sufficiently flexible so as to be capable of flexing in order to enable a particle caught in one of said holes to pass through said hole as water flows through said hole.

11. An elongated irrigation tube as claimed in claim 8 wherein:
    said holes are of a star shaped configuration, and
    said projections are sufficiently flexible so as to be capable of flexing in order to enable a particle caught in one of said holes to pass through said hole as water flows through said hole.

12. An elongated irrigation tube defined by a peripheral wall;
    dispensing hole walls defining a series of dispensing holes leading through said peripheral wall from the interior of said elongated irrigation tube to the exterior of said elongated irrigation tube in which the improvement comprises:
    said dispensing holes being non-round holes wherein all the walls defining each of said holes are substantially straight in a plane at a right angle with respect to the irrigation water outflow direction therethrough so that each of said holes has a greater circumference than a round hole of the same area said dispensing holes being sufficiently small so that under the intended conditions of use of said elongated irrigation tube with irrigation water flowing from the interior to the exterior of said elongated irrigation tube through said dispensing holes that such flow will be turbulent flow and will be accompanied by limited flow due to migration of the boundary layers formed as a result of such flow.

13. An elongated irrigation tube as claimed in claim 12 wherein:
    said holes have a square shaped cross-sectional configuration.

14. An elongated irrigation tube as claimed in claim 12 wherein:
    said holes have a triangular shaped cross-sectional configuration.

15. An elongated irrigation tube as claimed in claim 12 wherein:
    said holes have a star shaped cross-sectional configuration.

16. An elongated irrigation tube as claimed in claim 12 wherein:
    said star shaped configuration is defined by internal projections in said holes, said projections being sufficiently flexible as to be capable of passing particles as said tube is used.

* * * * *